June 22, 1937.  H. E. BROOKS  2,084,723
ADJUSTING MEANS FOR VARIABLE SPEED TRANSMISSION
Filed March 27, 1936
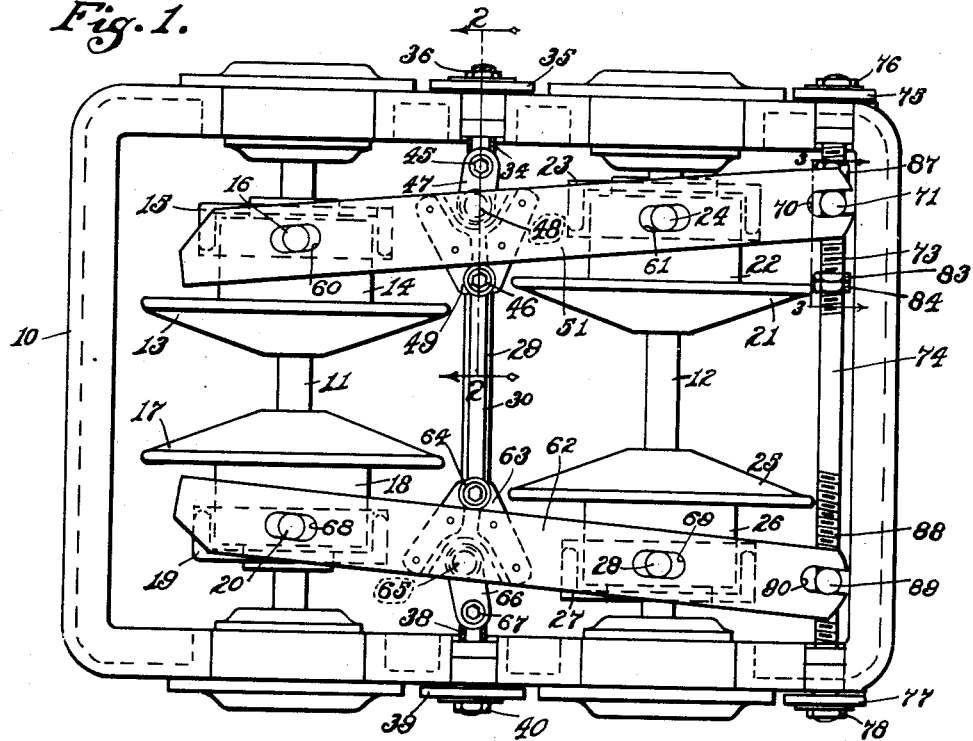
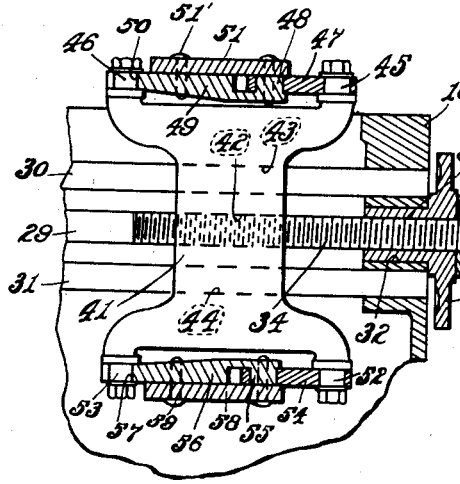
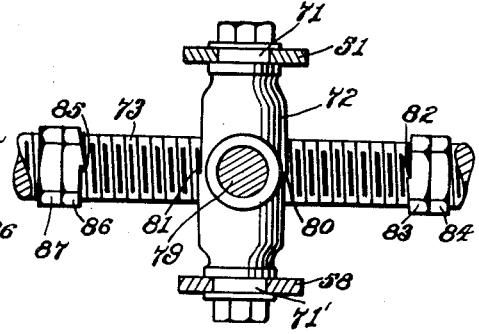
INVENTOR.
Harry E. Brooks,
BY
Hood & Hahn.
ATTORNEYS.

Patented June 22, 1937

2,084,723

UNITED STATES PATENT OFFICE 2,084,723

ADJUSTING MEANS FOR VARIABLE SPEED TRANSMISSION

Harry E. Brooks, Columbus, Ind., assignor to Reeves Pulley Company, Columbus, Ind., a corporation of Indiana Application March 27, 1936, Serial No. 71,108

14 Claims. (Cl. 74—230.17)

The present application relates to adjusting means for variable speed transmissions of the "Reeves" type. A primary object of the invention is to provide improved fulcruming means for the operating levers of the transmission. A further object of the invention is to provide improved actuating means for the operating levers of the transmission. A still further object of the invention is to provide means whereby the fulcrums for the two levers may be simultaneously adjusted in the same direction; and a still further object of the invention is to provide means whereby the actuating means for the two levers may be simultaneously adjusted in the same direction. Still further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Fig. 1 is a plan view of a transmission of the "Reeves" type embodying my invention;

Fig. 2 is an enlarged sectional view taken substantially on the line 2—2 of Fig. 1 and looking in the direction of the arrows; and Fig. 3 is an enlarged fragmentary section taken substantially on the line 3—3 of Fig. 1 and looking in the direction of the arrows.

I have illustrated the usual frame 10 in which are journalled parallel shafts 11 and 12. A coned disc 13 is splined on the shaft 11 and is operatively connected to a thrust bearing 14 with which is associated a pressure-equalizer member 15 formed to provide two oppositely projecting trunnions 16, of which only one is shown. A second coned disc 17 is splined on the shaft 11 in facing relation to the disc 13, said disc 17 having operatively connected thereto a thrust bearing 18 with which is operatively associated a pressure-equalizing element 19 provided with oppositely projecting trunnions 20, one only of which is shown.

A coned disc 21 is splined on the shaft 12 and has operatively connected thereto a thrust bearing 22 with which is operatively associated a pressure-equalizing element 23 provided with oppositely projecting trunnions 24, one only of which is shown. In facing relation to the disc 21 is a coned disc 25, splined on the shaft 12, and operatively connected to a thrust bearing 26, with which is operatively associated a pressure-equalizing element 27 provided with oppositely projected trunnions 28, one only of which is shown.

Between the shafts 11 and 12, and parallel thereto, is a shaft 29; and positioned in the same vertical axial plane are two rods 30 and 31 suitably secured in the frame 10. In one wall of the frame there is formed a bore 32 in which is rotatably mounted a bushing 33 which is threadedly associated with a threaded portion 34 of the shaft 29. The bushing 33 is provided with a hand wheel 35 positioned outside the frame 10 and bearing against the outside wall of said frame, whereby said bushing is held against movement downwardly, as viewed in Fig. 1. A lock nut 36 is threaded on the end 34 of the shaft 29 and is adapted to be jammed against the hand wheel 35 to lock said bushing 33 against rotation with respect to the shaft 29. If desired, there may be provided a set screw 37 for more firmly locking the lock nut 36 and the hand wheel 35 together, and to the shaft 29.

The opposite end 38 of the shaft 29 is formed with threads, the pitch of which is opposite to the pitch of the threads on the portion 34; and a similar bushing is threaded on said end 38, said bushing being provided with a hand wheel 39; and a lock nut 40 being associated with said hand wheel. If desired, the lock nut 40 may be provided with a set screw similar to the set screw 37.

It will be seen that the shaft 29 is thus journalled in the frame through the medium of the bushing 33 and the bushing associated with the hand wheel 39. If it is desired to rotate the shaft 29, the lock nuts 36 and 40 are set against the hand wheels 35 and 39, and either of said hand wheels may then be rotated, whereby the shaft 29 will be rotated with them. If, however, it is desired to shift the shaft 29 bodily upwardly, as viewed in Fig. 1, the nut 40 may be backed away from the hand wheel 39, the hand wheel 39 may thereupon be rotated without turning the shaft 29 to back said hand wheel again into contact with the nut 40; the nut 36 may then be moved away from the hand wheel 35; and thereupon, rotation of the hand wheel 35 in a counterclockwise direction, as viewed from the right of Fig. 2, will move said shaft bodily until the hand wheel 39 again comes into contact with the wall of the frame 10.

A nut 41 is provided with a threaded bore 42 whereby it is threadedly mounted on the portion 34 of the shaft 29. Said nut is further provided with two smooth bores 43 and 44 through which pass, respectively, the rods 30 and 31 to hold said nut 41 against rotation.

The nut 41 is formed to provide two parallel fulcrum elements 45 and 46 which project upwardly from said nut and which are positioned substantially in the vertical axial plane of the shaft 29 and are spaced from each other in the direction of the axis of said shaft. Upon the fulcrum element 45 is pivotally mounted one end of a link 47, the opposite end of which provides a pivotal mounting for a stud 48 formed upon a plate 49. The portion of said plate 49 remote from said stud 48 is formed with an open-ended notch 50 in which is embraced the fulcrum element 46. Thus a lost motion connection is provided between said fulcrum element 46 and the plate 49. A lever 51 is secured, intermediate its ends, to the plate 49 by means of rivets 51', or other suitable fastening means.

The nut 41 is further formed to provide a fulcrum element 52 aligned with the fulcrum element 45 and a fulcrum element 53 aligned with the fulcrum element 46, said elements 52 and 53 projecting oppositely with respect to the elements 45 and 46.

One end of a link 54 is pivotally mounted on the fulcrum element 52, and the other end of said link provides a pivotal mounting for a stud 55 on a plate 56.

Said plate 56, at a point remote from the stud 55, is formed with an open-ended notch, as at 57, embracing the fulcrum element 53. A lever 58 is secured, intermediate its ends, to the plate 56 by rivets 59, or other suitable fastening means.

The lever 51 is formed, adjacent its opposite ends, with elongated slots 60 and 61, the slot 60 embracing the trunnion 16, and the slot 61 embracing the trunnion 24. The lever 58, which is completely hidden in Fig. 1 by the lever 51, is similarly formed with slots engaging the other trunnions on the elements 15 and 23.

A lever 62 is suitably secured to a plate 63 which is formed with an open-ended notch embracing a fulcrum element 64, which corresponds to the element 46, upon a nut similar to the nut 41 which is mounted on the end 38 of the shaft 29. Said plate is pivotally mounted, as at 64, upon one end of a link 66, the opposite end of which is pivotally mounted upon a fulcrum element 67 corresponding to the fulcrum element 45. Said lever 62 is formed with elongated slots 68 and 69 embracing, respectively, the trunnions 20 and 28; and it is to be understood that a fourth lever, similar to the lever 62, is associated with said lever and with the elements 19 and 27, just as the lever 58 is associated with the lever 51.

One end of the lever 51 is formed with an open-ended notch 70 embracing a fulcrum element 71 formed on a nut 72, said nut being threadedly mounted upon a threaded portion 73 adjacent one end of a shaft 74. Said end 73 of the shaft 74 threadedly carries a bushing similar to the bushing 33, said bushing being journalled in a suitable aperture in the frame 10 and being provided with a hand wheel 75 backed up by a lock nut 76. The opposite end 88 of the shaft 74 is formed with threads, the pitch of which is opposite to the pitch of the threads on the portion 73; and said end 38 threadedly carries a bushing similar to the bushing 33, suitably journalled in an aperture in the frame 10, and provided with a hand wheel 77 backed up by a lock nut 78. It will be seen, thus, that the shaft 74 is mounted exactly as is the shaft 29.

The nut 72 is provided with an arm 79 having a shoe (not shown) engaged between the levers 51 and 58, to prevent rotation of the nut 72.

Preferably, said nut 72 is formed with shoulders 80 and 81, the shoulder 80 being engageable by teeth 82 formed on a stop nut 83 adjustably mounted on the shaft and backed up by a lock nut 84; and the shoulder 81 is engageable by teeth 85 formed on a stop nut 86 mounted on the shaft and backed up by a lock nut 87. The nut 72 is formed to provide a fulcrum element 71' which is embraced by the notched end of the lever 58.

The end 88 of the shaft 74 threadedly carries a nut similar to the nut 72 and formed to provide a fulcrum element 89 embraced by the notch 90 of the lever 62; and the lower lever corresponding to the lever 62 is similarly notched to embrace a similar fulcrum element projecting downwardly from the nut mounted on the end 88 of the shaft 74.

It will be seen that, when the hand wheel 75 (or the hand wheel 77) is rotated to turn the shaft 74 in a clockwise direction, as viewed from the bottom of Fig. 1, the nut 72 will be moved downwardly, as viewed in Fig. 1, whereupon the lever 51 will be rotated in a clockwise direction about its pivotal mounting 48, and the link 47 will be simultaneously moved in a counter-clockwise direction about its fulcrum element 45. The lever 62 will be similarly, but oppositely, moved; whereby the discs 21 and 25 will be moved toward each other, and the discs 13 and 17 will be moved away from each other.

Of course, it is to be understood that the pulleys, formed, respectively, by the discs 13 and 17, and by the discs 21 and 25, are intended to be connected by an edge-active belt. If, after the organization has been assembled, it is found that the belt is out of alignment, a suitable adjustment may be made by shifting the shaft 74, and the nuts mounted thereon, bodily. For instance, if the pulley formed by the discs 21 and 25 has its median plane disposed, in Fig. 1, above the median plane of the pulley formed by the discs 13 and 17, adjustment of the shaft 74 downwardly, as viewed in Fig. 1, will move both discs 21 and 25 downwardly, and will simultaneously move both discs 13 and 17 both upwardly. It will be obvious that adjustment to cure such a misalignment will be very much simpler, with the structure of the present invention, than it would be if it were necessary to adjust the nut 72 and the nut mounted on the end 88 of the shaft 74, separately along said shaft. It will also be obvious that the structure of the present invention makes it possible to obtain an absolutely accurate alignment of the median planes of the two expansible pulleys, even though the threads on the portions 73 and 88 of the shaft 74 may have been somewhat inaccurately formed.

If it is desired to vary the tension of the belt, that tension may be adjusted by rotating the shaft 29, whereby the nut 41 and the nut mounted on the opposite end of the shaft 29 will be moved simultaneously either toward each other or away from each other. Bodily movement of the shaft 29, with the nuts mounted thereon, will cause both levers 51 and 62 to move about the fulcrum elements 71 and 89. If the shaft 29 is moved upwardly, as viewed from Fig. 1, it will be obvious that all four discs will likewise be moved upwardly, but the discs 13 and 17 will be moved to a greater degree than will be the discs 21 and 25. Clearly, therefore, matters of both alignment and tension may be adjusted by bodily movement of the shaft 29. The adjustment of the shaft 29, in connection with alignment of the median planes of the two pulleys, might be considered as a micrometer adjustment, to perfect a relatively rough adjustment effected by bodily movement of the shaft 74.

I claim as my invention:

1. In a device of the class described, two parallel shafts, a pair of coned discs splined on each of said shafts and forming two expansible V-pulleys, and means for adjusting said discs comprising a third shaft between said two shafts, said third shaft being provided, adjacent its opposite ends, with oppositely threaded portions, a nut threadedly mounted on each of said threaded portions, each nut being formed to provide two parallel fulcrum members spaced from each other in the direction of the axis of said third shaft, a link for each of said nuts having one end pivotally mounted on one of said fulcrums, a plate pivotally connected to the opposite end of each of said links and having an open notch receiving the other of said fulcrums, and a lever secured to each of said plates and operatively associated with one disc of each pair.

2. In a device of the class described, two parallel shafts, a pair of coned discs splined on each of said shafts and forming two expansible V-pulleys, and means for adjusting said discs comprising a third shaft between said two shafts, said third shaft being provided, adjacent its opposite ends, with oppositely threaded portions, a nut threadedly mounted on each of said threaded portions, each nut being formed to provide two parallel fulcrum members spaced from each other in the direction of the axis of said third shaft, a link for each of said nuts having one end pivotally mounted on one of said fulcrums, a lever pivotally connected, intermediate its ends, to the opposite end of each of said links, and having a sliding connection with the other fulcrum of the nut with which it is associated, and means providing an operative connection between each of said levers and one disc of each pair.

3. The combination with a lever of a mounting therefor comprising a threaded shaft, a nut threadedly mounted thereon and formed to carry two parallel fulcrum elements spaced from each other in the direction of the axis of said shaft, a link having one end pivotally mounted on one of said fulcrums, and means pivotally connecting said lever, intermediate its ends, to the other end of said link, said lever having a lost-motion connection with the other of said fulcrums.

4. In a device of the class described, a frame, a pair of parallel shafts journalled in said frame, two coned discs mounted on each of said shafts in facing relation and cooperating to form two expansible V-pulleys, a lever operatively engaging one disc of each pulley, a second lever operatively engaging the other disc of each pulley, and means providing fulcrums for said levers, comprising a threaded shaft journalled in said frame, two nuts threadedly mounted on said threaded shaft and carrying, respectively, fulcrums for said levers, and means for bodily adjusting said threaded shaft and nuts axially in said frame.

5. In a device of the class described, a frame, a pair of parallel shafts journalled in said frame, two coned discs mounted on each of said shafts in facing relation and cooperating to form two expansible V-pulleys, a lever operatively engaging one disc of each pulley, a second lever operatively engaging the other disc of each pulley, fulcrum means for said levers, and operating means for said levers comprising a threaded shaft journalled in said frame, two nuts threadedly mounted on said threaded shaft and having lost-motion connections with said respective levers, and means for bodily shifting said threaded shaft and nuts axially in said frame.

6. In a device of the class described, a frame, a pair of parallel shafts journalled in said frame, two coned discs mounted on each of said shafts in facing relation and cooperating to form two expansible V-pulleys, a lever operatively engaging one disc of each pulley, a second lever operatively engaging the other disc of each pulley, and means providing fulcrums for said levers, comprising a threaded shaft, two nuts threadedly mounted on said threaded shaft and carrying, respectively, fulcrums for said levers, a bushing threaded on one end of said shaft and journalled in said frame, said bushing being provided with a portion operable from outside said frame to rotate said bushing, and means effective, at times, to lock said bushing against rotation with respect to said threaded shaft.

7. In a device of the class described, a frame, a pair of parallel shafts journalled in said frame, two coned discs mounted on each of said shafts in facing relation and cooperating to form two expansible V-pulleys, a lever operatively engaging one disc of each pulley, a second lever operatively engaging the other disc of each pulley, and means providing fulcrums for said levers, comprising a threaded shaft, two nuts threadedly mounted on said threaded shaft and carrying, respectively, fulcrums for said levers, a bushing threaded on one end of said shaft and journalled in said frame, and means effective, at times, to lock said bushing against rotation with respect to said threaded shaft.

8. In a device of the class described, a frame, a pair of parallel shafts journalled in said frame, two coned discs mounted on each of said shafts in facing relation and cooperating to form two expansible V-pulleys, a lever operatively engaging one disc of each pulley, a second lever operatively engaging the other disc of each pulley, and means providing fulcrums for said levers, comprising a threaded shaft, two nuts threadedly mounted on said threaded shaft and carrying, respectively, fulcrums for said levers, a bushing threaded on one end of said shaft and journalled in said frame, a second bushing threaded on the opposite end of said shaft and journalled in said frame, and means effective, at times, to lock said bushings against rotation with respect to said threaded shaft.

9. In a device of the class described, a frame, a pair of parallel shafts journalled in said frame, two coned discs mounted on each of said shafts in facing relation and cooperating to form two expansible V-pulleys, a lever operatively engaging one disc of each pulley, a second lever operatively engaging the other disc of each pulley, and means providing fulcrums for said levers, comprising a threaded shaft, two nuts threadedly mounted on said threaded shaft and carrying, respectively, fulcrums for said levers, a bushing threaded on one end of said shaft and journalled in said frame, cooperative means on said bushing and said frame for holding said bushing against axial movement in at least one direction, a second bushing threaded on the opposite end of said threaded shaft and journalled in said frame, cooperative means on said second bushing and said frame for holding said second bushing against axial movement in at least one direction, and means effective, at times, to lock said bushings against rotation with respect to said threaded shaft.

10. In a device of the class described, a frame, a pair of parallel shafts journalled in said frame, two coned discs mounted on each of said shafts in facing relation and cooperating to form two expansible V-pulleys, a lever operatively engaging one disc of each pulley, a second lever operatively engaging the other disc of each pulley, fulcrum means for said levers, and operating means for said levers comprising a threaded shaft, two nuts threadedly mounted on said threaded shaft and having lost-motion connections with said respective levers, a bushing threaded on one end of said shaft and journalled in said frame, said bushing being provided with a portion operable from outside said frame to rotate said bushing, and means effective, at times, to lock said bushing against rotation with respect to said threaded shaft.

11. In a device of the class described, a frame, a pair of parallel shafts journalled in said frame, two coned discs mounted on each of said shafts in facing relation and cooperating to form two expansible V-pulleys, a lever operatively engaging one disc of each pulley, a second lever operatively engaging the other disc of each pulley, fulcrum means for said levers, and operating means for said levers comprising a threaded shaft, two nuts threadedly mounted on said threaded shaft and having lost-motion connections with said respective levers, a bushing threaded on one end of said shaft and journalled in said frame, and means effective, at times, to lock said bushing against rotation with respect to said threaded shaft.

12. In a device of the class described, a frame, a pair of parallel shafts journalled in said frame, two coned discs mounted on each of said shafts in facing relation and cooperating to form two expansible V-pulleys, a lever operatively engaging one disc of each pulley, a second lever operatively engaging the other disc of each pulley, fulcrum means for said levers, and operating means for said levers comprising a threaded shaft, two nuts threadedly mounted on said threaded shaft and having lost-motion connections with said respective levers, a bushing threaded on one end of said shaft and journalled in said frame, a second bushing threaded on the opposite end of said shaft and journalled in said frame, and means effective, at times, to lock said bushing against rotation with respect to said threaded shaft.

13. In a device of the class described, a frame, a pair of parallel shafts journalled in said frame, two coned discs mounted on each of said shafts in facing relation and cooperating to form two expansible V-pulleys, a lever operatively engaging one disc of each pulley, a second lever operatively engaging the other disc of each pulley, fulcrum means for said levers, and operating means for said levers comprising a threaded shaft, two nuts threadedly mounted on said threaded shaft and having lost-motion connections with said respective levers, a bushing threaded on one end of said shaft and journalled in said frame, cooperative means on said bushing and said frame for holding said bushing against axial movement in at least one direction, a second bushing threaded on the opposite end of said threaded shaft and journalled in said frame, cooperative means on said second bushing and said frame for holding said second bushing against axial movement in at least one direction, and means effective, at times, to lock said bushings against rotation with respect to said threaded shaft.

14. In a device of the class described, a frame, a pair of parallel shafts journalled in said frame, two coned discs mounted on each of said shafts in facing relation and cooperating to form two expansible V-pulleys, a lever operatively engaging one disc of each pulley, a second lever operatively engaging the other disc of each pulley, and means providing fulcrums for said levers, comprising a threaded shaft, two nuts threadedly mounted on said threaded shaft and carrying, respectively, fulcrums for said levers, a bushing threaded on one end of said shaft and journalled in said frame, a second bushing threaded on the opposite end of said shaft and journalled in said frame, and means effective, at times, to lock said bushings against rotation with respect to said threaded shaft, and operating means for said levers comprising a threaded shaft, two nuts threadedly mounted on said threaded shaft and having lost-motion connections with said respective levers, a bushing threaded on one end of said shaft and journalled in said frame, a second bushing threaded on the opposite end of said shaft and journalled in said frame, and means effective, at times, to lock said last mentioned bushings against rotation with respect to said threaded shaft.

HARRY E. BROOKS.